United States Patent
Lu et al.

(10) Patent No.: US 9,958,797 B1
(45) Date of Patent: May 1, 2018

(54) TONER PROCESS COMPRISING SYNTHESIZING AMPHIPHILIC BLOCK COPOLYMERS VIA EMULSION POLYMERIZATION

(71) Applicant: Xerox Corporation, Norwalk, CT (US)

(72) Inventors: Chunliang Lu, Webster, NY (US); Yanjia Zuo, Rochester, NY (US); Shigeng Li, Penfield, NY (US); Peter Van Nguyen, Webster, NY (US); Linda S. Schriever, Penfield, NY (US); Chieh-Min Cheng, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/444,408

(22) Filed: Feb. 28, 2017

(51) Int. Cl.
*G03G 9/08* (2006.01)
*C08F 293/00* (2006.01)
*G03G 9/093* (2006.01)
*G03G 9/087* (2006.01)

(52) U.S. Cl.
CPC ....... *G03G 9/0806* (2013.01); *C08F 293/005* (2013.01); *G03G 9/08788* (2013.01); *G03G 9/09392* (2013.01); *C08F 2438/01* (2013.01); *C08F 2438/02* (2013.01)

(58) Field of Classification Search
CPC ............. G03G 9/0806; G03G 9/08788; G03G 9/09392; C08F 293/005
USPC ............................................ 430/109.1, 110.1
See application file for complete search history.

(56) References Cited

U.S. PATENT DOCUMENTS

| | | | |
|---|---|---|---|
| 4,298,672 A | 11/1981 | Lu | |
| 4,338,390 A | 7/1982 | Lu | |
| 4,935,326 A | 6/1990 | Creatura et al. | |
| 4,937,166 A | 6/1990 | Creatura et al. | |
| 6,593,049 B1 | 7/2003 | Veregin et al. | |
| 6,756,176 B2 | 6/2004 | Stegamat et al. | |
| 6,830,860 B2 | 12/2004 | Sacripante et al. | |
| 2004/0127634 A1 | 7/2004 | Parket et al. | |
| 2006/0142470 A1* | 6/2006 | Sato | C08F 287/00 524/556 |
| 2009/0053642 A1* | 2/2009 | Cheong | G03G 9/0819 430/110.2 |
| 2010/0081769 A1 | 4/2010 | Ma | |
| 2011/0144263 A1 | 6/2011 | Ma | |

OTHER PUBLICATIONS

Chunliang Lu et al., "One-Step Synthesis of Amphiphilic Ultrahigh Molecular Weight Block Copolymers by Surfactant-Free Heterogeneous Radical Polymerization," ACS Macro Letters, published Nov. 11, 2014, 2015, 4, 1317-1320.
Chunliang Lu et al., "Instantaneous Directional Growth of Block Copolymer Nanowires During Heterogeneous Radical Polymerization (HRP)," Nano Letters, published Mar. 22, 2016, 2016, 16, 2873-2877.
Nicolas Gaillard et al., "Block Copolymers of Acrylic Acid and Butyl Acrylate Prepared by Reversible Addition-Fragmentation Chain Transfer Polymerization: Synthesis, Characterization, and Use in Emulsion Polymerization," Journal of Polymer Science, Park A: Polymer Chemistry 41.5 (2003), 684-698.
Carine Burguiere, et al., "Amphiphilic Block Copolymers Prepared Via Controlled Radical Polymerization as Surfactants for Emulsion Polymerization," Macromolecular Symposia, vol. 150, No. 1, Wiley—VCH Verlag, 2000 pp. 39-44.
Hanying Zhao, et al., "Preparation of CdS Nanoparticles in Salt-Induced Block Copolymer Micelles," Langmuir 17.26 (2001), pp. 8428-8433.

* cited by examiner

*Primary Examiner* — Mark A Chapman
(74) *Attorney, Agent, or Firm* — Marylou J. Lavoie, Esq. LLC

(57) ABSTRACT

A toner process comprising (a) providing at least one amphiphilic block copolymer prepared by surfactant-free emulsion polymerization comprising: dissolving a hydrophilic monomer in water; adding a hydrophobic monomer; adding a feed initiator to produce a colloidal dispersion of amphiphilic block copolymer; and optionally, discharging the amphiphilic block copolymer; (b) contacting one or more of a latex polymer, a wax; and a colorant with the colloidal dispersion of amphiphilic block copolymer to form a blend; or contacting the discharged amphiphilic block copolymer with one or more of a latex polymer, a wax dispersion, and a colorant dispersion, and forming a further dispersion; (c) heating the blend or further dispersion at a temperature below the glass transition temperature of the latex polymer to form aggregated toner particles; (d) adding a coalescing agent to the toner particles thereby coalescing the toner particles; and (e) recovering the toner particles.

15 Claims, No Drawings

TONER PROCESS COMPRISING SYNTHESIZING AMPHIPHILIC BLOCK COPOLYMERS VIA EMULSION POLYMERIZATION

BACKGROUND

Disclosed herein is a surfactant-free emulsion polymerization process for producing amphiphilic block copolymers. Further disclosed is a toner process comprising: (a) providing at least one amphiphilic block copolymer, wherein the amphiphilic block copolymer is prepared by surfactant-free emulsion polymerization comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced colloidal dispersion of amphiphilic block copolymer; (b) contacting one or more components selected from the group consisting of a latex polymer, a wax; and a colorant with the colloidal dispersion of amphiphilic block copolymer to form a blend; or contacting the discharged amphiphilic block copolymer with one or more latexes or dispersions selected from the group consisting of a latex polymer, a polymer dispersion, a wax dispersion, and a colorant dispersion, and forming a dispersion; (c) heating the blend or dispersion at a temperature below the glass transition temperature of the latex polymer to form aggregated toner particles; (d) adding a coalescing agent to the toner particles thereby coalescing the toner particles; and (e) optionally, recovering the toner particles.

Raw materials for emulsion aggregation toners include various colloidal dispersions. Methods to obtain stable and functional colloidal dispersions are desirable for emulsion aggregation processes. It is desirable to develop improved, up-to-date methods for stabilizing organic, inorganic, and hybrid particles employed in emulsion aggregation toner processes. Dispersion agents, including surfactants and amphiphilic block copolymers, have been used in these processes. When used as surfactants, amphiphilic block copolymers have certain advantages over conventional small molecular weight surfactants, such as low critical micelle concentrations (CMCs), higher stability, less foaming, among other advantages. Further, amphiphilic block copolymers have application prospects in the fields of colloidal dispersions, adhesives, compatibilizers, dispersing agents for pigments and inorganic particles including quantum dots, and other fields.

Block copolymers can be prepared by living polymerization methods such as anionic polymerization, group transfer polymerization (GTP), nitroxide-mediated free radical polymerization, atom transfer radical polymerization (ATRP), or reversible addition-fragmentation chain transfer (RAFT) polymerization.

Most of the living polymerization approaches, such as GTP polymerization, require special and costly raw materials including special initiating systems and high purity monomers. Some of them have to be carried out under extreme conditions such as low moisture or low temperature. Further, some of these methods are sensitive to the active hydrogen groups on the monomers such as the hydroxyl and carboxylic acid groups. These groups would have to be chemically protected during the polymerization and recovered in a subsequent step. In addition, some of the initiating systems bring undesirable color, odor, metal complexes, or potentially corrosive halides into the product. Extra steps would be required to remove them.

Currently, the majority of the synthetic procedures for preparing amphiphilic block copolymers are based on controlled radical polymerizations (CRPs), which require elaborate and time-consuming synthesis. In fact, the implementation of CRPs in industry still remains limited due to the inevitable difficulties and disadvantages.

U.S. Patent Application Publication 2010/0081769, which is hereby incorporated by reference herein in its entirety, describes in the Abstract thereof a process for producing a linear block copolymer, useful as a dispersant for pigment, wherein the block copolymer comprises acetoacetyl amine functional groups which serve as pigment anchoring groups. The acetoacetyl amine functional groups can be formed by reacting hydroxyl functional groups with an acetoacetate agent and then reacting the resulted acetoacetate functional groups with a primary amine. The linear block copolymer can be an AB, ABC, or ABA block copolymer. The linear block copolymer produced by the present invention can be useful in dispersing and stabilizing a wide range of pigments in solvent based systems, and are particularly useful in providing pigment dispersions that are used in coating compositions for automobiles and trucks, where they provide improved efficiency of pigment use, lower paint viscosity, and reduced emission of volatile organic solvent. See also U. S. Patent Application Publication 2011/0144263, which is hereby incorporated by reference herein in its entirety, which describes in the Abstract thereof a linear block copolymer, useful as a dispersant for pigment, wherein the block copolymer comprises acetoacetyl amine functional groups which serve as pigment anchoring groups.

Currently available stabilizing and dispersing agents are suitable for their intended purposes. However a need remains for improved stabilizing and dispersing agents. Further, a need remains for improved stabilizing and dispersing agents for emulsion aggregation toner processes. Further, a need remains for improved processes for preparing stabilizing and dispersing agents, in embodiments, improved processes for preparing amphiphilic block copolymers that are suitable for such purposes.

The appropriate components and process aspects of the each of the foregoing U. S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a toner process comprising (a) providing at least one amphiphilic block copolymer, wherein the amphiphilic block copolymer is prepared by surfactant-free emulsion polymerization comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced colloidal dispersion of amphiphilic block copolymer; (b) contacting one or more components selected from the group consisting of a latex polymer, a wax; and a colorant with the colloidal dispersion of amphiphilic block copolymer to form a blend; or contacting the discharged amphiphilic block copolymer with one or more latexes or dispersions selected from the group consisting of a latex polymer, a polymer dispersion, a wax dispersion, and a colorant dispersion, and forming a dispersion; (c) heating the blend or dispersion at a temperature below the glass transition temperature of the latex polymer to form aggregated toner particles; (d) adding a coalescing agent to the toner particles thereby coalescing the toner particles; and (e) optionally, recovering the toner particles.

Also described is a surfactant-free emulsion polymerization process comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced amphiphilic block copolymer from the colloidal dispersion of amphiphilic block copolymer.

Also described is a dispersing agent comprising an amphiphilic block copolymer; wherein the amphiphilic block copolymer is prepared by a process comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced amphiphilic block copolymer dispersing agent from the colloidal dispersion of amphiphilic block copolymer.

DETAILED DESCRIPTION

A heterogeneous synthetic environment of emulsion polymerization is described to produce amphiphilic block copolymers in a one step process directly from low-priced commercial monomers and initiators. A greatly simplified block copolymer synthesis process is provided which significantly reduces the raw materials cost, leading to very promising applications in a wide range of areas including toner related colloidal synthesis.

The process and amphiphilic block copolymers herein can be utilized in optimizing development of functional inorganic additives, pigment and wax dispersions, hybrid toners and so on.

The method herein comprises synthesizing amphiphilic block copolymers using one-step emulsion polymerization. By taking advantage of the hydrophilic and hydrophobic monomer partitioning in aqueous and dispersed phases, as well as controlling the low amount of active radicals in the heterogeneous system, the polymerization automatically leads to the sequential formation of hydrophilic and hydrophobic blocks. These block copolymers may have great potential in the colloidal synthesis related to the emulsion aggregation process as well as synthesis of functional additives.

The process herein is a surfactant-free process. That is, there is no surfactant used in the process.

In embodiments, the surfactant-free emulsion polymerization process comprises dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced amphiphilic block copolymer from the colloidal dispersion of amphiphilic block copolymer.

The amphiphilic block copolymer produced comprises hydrophobic chain segments and hydrophilic chain segments in different chain blocks.

Any suitable or desired hydrophilic monomer or hydrophobic monomer can be selected. Monomers used herein can include at least one monomer selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkyl-methacrylamide, N,N-dialkylacrylamide, N,N-dialkyl-methacrylamide, isoprene, 1,3-butadiene, ethylene, vinyl acetate, vinyl chloride, vinylidene chloride, oxidants, lactones, lactams, cyclic anhydrides, cyclic siloxanes and combinations thereof. Functionalized versions of these monomers may also be used. Specific monomers or co-monomers that may be selected include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacrylamide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, vinyl benzoic acid (all isomers), diethylaminostyrene (all isomers), α-methylvinyl benzoic acid (all isomers), diethylamino alpha-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, maleic anhydride, N-phenylmaleimide, N-butylmaleimide, chloroprene, ethylene, vinyl acetate, vinyl chloride, vinylidene chloride, 2-(2-oxo-1-imidazolidinyl-)ethyl 2-methyl-2-propenoate, 1-[2-[2-hydroxy-3-(2-propyl)propylamino]ethyl]-2-imidazolidonone, N-vinyl pyrrolidone, N-vinyl imidazole, crotonic acid, vinyl sulfonic acid, and combinations thereof. In embodiments, the monomer can be selected from cycloalkyl methacrylate, substituted alkyl methacrylate, cyclomethacrylate, and combinations thereof. In embodiments, the monomer can be substituted with any suitable or desired substituent, in embodiments, with a substituent selected from the group consisting of silyl groups, boryl groups, phosphino groups, amino groups, thio groups, and seleno groups.

In embodiments, the at least one hydrophilic monomer is selected from the group consisting of β-carboxyethyl acrylate, methacrylic acid, sodium 4-vinylbenzenesulfonate, 2-sulfoethyl methacrylate, 4-vinylbenzoic acid, sodium acrylate, 3-sulfopropyl methacrylate sodium salt, 3-sulfopropyl methacrylate potassium salt, N,N-diethylacrylamide, N,N-dimethylacrylamide, 2-(N,N-diethylamino)ethyl methacrylate, 2-(N,N-dimethylamino)ethyl acrylate, N-(2-aminoethyl) methacrylamide hydrochloride, 2-acryloxyethyltrimethylammonium chloride, N-(2-aminoethyl) methacrylamide hydrochloride, methacryloyl-L-Lysine, and combinations thereof.

Dissolving the hydrophilic monomer can be done by any suitable or desired process. In embodiments, dissolving the hydrophilic monomer comprises dissolving the hydrophilic monomer in water, optionally under agitation. Any suitable or desired agitation method can be employed as known in the art.

The hydrophilic monomer can be added in any suitable or desired amount. In embodiments, the hydrophilic monomer is included in an amount of from about 0.001 mM (millimolar, $10^{-3}$ mol/liter concentration) to about 3 M (molar/mol/liter concentration), from about 1 mM to about 1.5 M, or from about 10 mM to about 1 M.

Any suitable or desired hydrophobic monomer can be selected. In embodiments, the at least one hydrophobic monomer is selected from the group consisting of styrene, alkyl acrylates, alkyl methacrylates, benzyl methacrylates, 2-phenoxyethyl methacrylate, and combinations thereof.

The hydrophobic monomer can be added in any suitable or desired amount. In embodiments, the hydrophobic monomer is included in an amount of from about 0.001 mM (millimolar, $10^{-3}$ mol/liter concentration) to about 3 M (molar/mol/liter concentration), from about 1 mM to about 1.5 M, or from about 10 mM to about 1 M.

In embodiments, a feed initiator is added. Any suitable or desired feed initiator can be selected. In embodiments, the feed initiator is selected from the group consisting of ammonium persulfate, potassium persulfate, azobisisobutyronitrile, water soluble azo initiators, and combinations thereof. In embodiments, water soluble azo initiators known as VA-044, V-50, VA-057, VA-061, VA-086, V-501, available from Wako Specialty Chemicals can be selected.

Desirably, the feed initiator (such as ammonium/potassium persulfate, etc.) solution is added continuously at a very low rate to initiate polymerization. In embodiments, the feed initiator is added continuously at a rate of from about $10^{-6}$ mM/minute to about 100 mM/minute, or from about $10^{-6}$ mM/minute to about 10 mM/minute, or from about $10^{-6}$ mM/minute to about 1 mM/minute.

The amphiphilic block copolymer produced by the method herein comprises homopolymer blocks. The amphiphilic block copolymer has at least two distinct glass transition temperatures corresponding to the glass transition temperature of each homopolymer.

In embodiments, the amphiphilic block copolymer produced by the method herein is a higher molecular weight polymer than produced by previous methods. In embodiments, the amphiphilic block copolymer has a molecular weight of from about Mw=5,000 g/mol to about $5\times10^6$ g/mol, or from about $1\times10^4$ g/mol to about $2\times10^6$ g/mol, or from about $2\times10^4$ g/mol to about $2\times10^6$ g/mol.

In embodiments, the amphiphilic block copolymer produced by the method herein has a weight average molecular weight (Mw) of from about 5,000 g/mol to about $5\times10^6$ g/mol, in embodiments of from about $2\times10^4$ g/mol to about $5\times10^5$ g/mol, a number average molecular weight (Mn) as measured by gel permeation chromatography (GPC) using polystyrene standards of from about $2\times10^3$ g/mol to about $1\times10^6$ g/mol, in embodiments from about $1\times10^4$ g/mol to about $5\times10^4$ g/mol, and a molecular weight distribution (Mw/Mn) of from about 1.1 to about 6, in embodiments from about 2 to about 4.

In embodiments, a toner process herein comprises (a) providing at least one amphiphilic block copolymer, wherein the amphiphilic block copolymer is prepared by surfactant-free emulsion polymerization comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced colloidal dispersion of amphiphilic block copolymer; (b) contacting one or more components selected from the group consisting of a latex polymer, a wax; and a colorant with the colloidal dispersion of amphiphilic block copolymer to form a blend; or contacting the discharged amphiphilic block copolymer with one or more latexes or dispersions selected from the group consisting of a latex polymer, a polymer dispersion, a wax dispersion, and a colorant dispersion, and forming a dispersion; (c) heating the blend or dispersion at a temperature below the glass transition temperature of the latex polymer to form aggregated toner particles; (d) adding a coalescing agent to the toner particles thereby coalescing the toner particles; and (e) optionally, recovering the toner particles.

In embodiments, the toner process includes dissolving at least one hydrophilic monomer in water under agitation.

In embodiments, the toner process includes adding the feed initiator continuously at a rate of from about $10^{-4}$ mM/minute (millimolar, $10^{-3}$ mol/liter concentration) to about 1 M/minute (Molar/mol/liter concentration).

In embodiments, the toner process comprises wherein the amphiphilic block copolymer produced in step (a) comprises homopolymer blocks and wherein the amphiphilic block copolymer has at least two distinct glass transition temperatures corresponding to the glass transition temperature of each homopolymer.

In embodiments, the toner process comprises wherein the amphiphilic block copolymer produced in step (a) comprises hydrophobic chain segments and hydrophilic chain segments in different chain blocks.

In embodiments, the toner process comprises wherein the amphiphilic block copolymer produced in step (a) comprises a molecular weight of from about $10^4$ g/mol to about $5\times10^6$ g/mol.

In embodiments, the toner process comprises wherein the at least one hydrophilic monomer is selected from the group consisting of γ-carboxyethyl acrylate, methacrylic acid, sodium 4-vinylbenzenesulfonate, 2-sulfoethyl methacrylate, 4-vinylbenzoic acid, sodium acrylate, 3-sulfopropyl methacrylate sodium salt, 3-sulfopropyl methacrylate potassium salt, N,N-diethylacrylamide, N,N-dimethylacrylamide, 2-(N,N-diethylamino)ethyl methacrylate, 2-(N,N-dimethylamino)ethyl acrylate, N-(2-aminoethyl) methacrylamide hydrochloride, 2-acryloxyethyltrimethylammonium chloride, N-(2-aminoethyl) methacrylamide hydrochloride, methacryloyl-L-Lysine, and combinations thereof.

In embodiments, the toner process comprises wherein the at least one hydrophobic monomer is selected from the group consisting of styrene, alkyl acrylates, alkyl methacrylates, benzyl methacrylates, 2-phenoxyethyl methacrylate, and combinations thereof.

In embodiments, the toner process comprises wherein the feed initiator is selected from the group consisting of ammonium persulfate, potassium persulfate, azobisisobutyronitrile, water soluble azo initiators, and combinations thereof.

In embodiments, the toner process further comprises adding a second latex polymer to the aggregated toner particles to form a shell over the aggregated toner particles thereby forming a core-shell toner; and adding the coalescing agent to the toner particles, and subsequently heating the core-shell toner with the coalescing agent at a temperature above the glass transition temperature of the second latex polymer. Thus, a toner produced by the process herein is provided.

Thus, a toner herein comprises at least one component produced with the amphiphilic block copolymer of the present embodiments as a surfactant or dispersing agent. In embodiments, the toner components prepared with the amphiphilic block copolymer of the present embodiments are selected from the group consisting of resin particles, latex particles, wax, colorant, among others.

Latex Particle.

The latex particles can be formed by any suitable or desired process. The formed latex particles can be dried using any suitable or desired method including, but not limited to, spray drying or freeze drying. The latex particles can be dispersed in an electrolyte with surfactant using any suitable or desired process, such as sonication or shear, to break up aggregates in a similar manner as used when preparing a pigment dispersion. In embodiments, the latex particles are dispersed using the amphiphilic block copolymer described herein. The formed latex particle is used as a raw material dispersion in a toner process, in embodiments, an emulsion aggregation process, with the amphiphilic block copolymer. The latex particle can be formed from any suitable or desired resin or polymer.

Resin.

Any suitable or desired resin can be used in the processes herein. The resin or polymers can be used to form the hybrid metallic-latex particle. The resin or polymers can also be used for any additional resin or polymer that is desirably included in the toner. In embodiments, the toner resin can be an amorphous resin, a crystalline resin, or a mixture or combination thereof. In further embodiments, the resin can be a polyester resin, including the resins described in U.S. Pat. No. 6,593,049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In embodiments, the resin is polyester. In certain embodiments, the resin is amorphous polyester, crystalline polyester, or a mixture thereof.

For forming a crystalline polyester, one or more polyol branching monomers can be reacted with a diacid in the presence of an optional catalyst and a further organic diol suitable for forming the crystalline resin including aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers. The aliphatic diol may be present in any suitable or desired amount, such as from about 25 to about 60 mole percent, or from about 25 to about 55 mole percent, or from about 25 to about 53 mole percent of the resin. In embodiments, a third diol can be selected from the above-described diols in an amount of from about 0 to about 25 mole percent, or from about 1 to about 10 mole percent of the resin.

Examples of organic diacids or diesters including vinyl diacids or vinyl diesters that can be selected for the preparation of the crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof. The organic diacid can be present in any suitable or desired amount, in embodiments, from about 25 to about 60 mole percent, or from about 25 to about 52 mole percent, or from about 25 to about 50 mole percent. In embodiments, a second diacid can be selected from the above-described diacids and can be present in an amount of from about 0 to about 25 mole percent of the resin.

For forming crystalline polyester, one or more polyacid branching monomers can be reacted with a diol in the presence of an optional catalyst and a further organic diacid or diester. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

Examples of diacids or diesters suitable for use in forming the resin herein include vinyl diacids or vinyl diesters used for the preparation of amorphous polyester resins including dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof.

The organic diacid or diester may be present in any suitable or desired amount, such as from about 35 to about 60 mole percent of the resin, or from about 42 to about 52 mole percent of the resin, or from about 45 to about 50 mole percent of the resin.

Examples of diols which may be used to prepared the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyloheaxanediol, diethylene glycol, bis(2-hydroxyethyl) oxide, dipropylene glycol, dibutylene, and mixtures and combinations thereof.

The organic diol can be present in any suitable or desired amount, such as from about 35 to about 60 mole percent of the resin, or from about 42 to about 55 mole percent of the resin, or from about 45 to about 53 mole percent of the resin.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, and mixtures and combinations thereof. Such catalysts may be utilized in any suitable or desired amount, such as from about 0.01 mole percent to about 5 mole percent based on the starting diacid or diester used to generate the polyester resin.

The resin can be prepared by any suitable or desired method. For example, one or more monomers can be combined with one or more acid or diester components in the optional presence of a catalyst, heated, optionally in an inert atmosphere, to condense the monomers into prepolymers. To this mixture can be added one or more diacids or diesters, optionally additional catalyst, optionally a radical inhibitor, with heating, optionally under inert atmosphere, to form the desired final resin (polyester).

Heating can be to any suitable or desired temperature, such as from about 140° C. to about 250° C., or about 160° C. to about 230° C., or about 180° C. to about 220° C.

Any suitable inert atmosphere conditions can be selected, such as under nitrogen purge.

If desired, a radical inhibitor can be used. Any suitable or desired radical inhibitor can be selected, such as hydroquinone, toluhydroquinone, 2,5-DI-tert-butylhydroquinone, and mixtures and combinations thereof. The radical inhibitor can be present in any suitable or desire amount, such as from about 0.01 to about 1.0, about 0.02 to about 0.5, or from about 0.05 to about 0.2 weight percent of the total reactor charge.

In embodiments, the resin can be pre-blended with a weak base or neutralizing agent. In embodiments, the base can be a solid, thereby eliminating the need to use a solution, which avoids the risks and difficulties associated with pumping a solution.

In embodiments, the resin and the neutralizing agent can be simultaneously fed through a co-feeding process which may accurately control the feed rate of the neutralizing agent and the resin into an extruder and which may then be melt mixed followed by emulsification.

In embodiments, the neutralizing agent can be used to neutralize acid groups in the resins. Any suitable or desired neutralizing agent can be selected. In embodiments, the neutralizing agent can be selected from the group consisting of ammonium hydroxide, potassium hydroxide, sodium hydroxide, sodium carbonate, sodium bicarbonate, lithium hydroxide, potassium carbonate, and mixtures and combinations thereof.

The neutralizing agent can be used as a solid, such as sodium hydroxide flakes, etc., in an amount of from about 0.001% to about 50% by weight, or from about 0.01% to about 25% by weight, or from about 0.1% to about 5% by weight, based on the weight of the resin.

In certain embodiments, the neutralizing agent is a solid neutralizing agent selected from the group consisting of ammonium hydroxide flakes, potassium hydroxide flakes, sodium hydroxide flakes, sodium carbonate flakes, sodium bicarbonate flakes, lithium hydroxide flakes, potassium carbonate flakes, organoamines, and mixtures and combinations thereof.

In embodiments, the neutralizing agent can be sodium hydroxide flakes. In embodiments, the surfactant used can be an aqueous solution of alkyldiphenyloxide disulfonate to ensure that proper resin neutralization occurs when using sodium hydroxide flakes and leads to a high quality latex with low coarse content. Alternatively, a solid surfactant of sodium dodecyl benzene sulfonate can be used and co-fed with the resin into the extruder feed hopper eliminating the need to use a surfactant solution thereby providing a simplified and efficient process.

An emulsion formed in accordance with the present process can also include a small amount of water, in embodiments, deionized water, in any suitable or desired amount, such as from about 20% to about 300%, or from about 30% to about 150%, by weight of the resin, at temperatures that melt or soften the resin, such as from about 40° C. to about 140° C., or from about 60° C. to about 100° C.

Further, any other monomer suitable for preparing a latex for use in a toner may be utilized as the resin. As noted above, in embodiments, the toner may be produced by emulsion aggregation. Suitable monomers useful in forming a latex polymer emulsion, and thus the resulting latex particles in the latex emulsion, include, but are not limited to, styrenes, acrylates, methacrylates, butadienes, isoprenes, acrylic acids, methacrylic acids, acrylonitriles, combinations thereof, and the like.

In embodiments, the latex polymer may include at least one polymer. Exemplary polymers include styrene acrylates, styrene butadienes, styrene methacrylates, and more specifically, poly(styrene-alkyl acrylate), poly(styrene-1,3-diene), poly(styrene-alkyl methacrylate), poly (styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly (styrene-1,3-diene-acrylonitrile-acrylic acid), poly(alkyl acrylate-acrylonitrile-acrylic acid), poly(styrene-butadiene), poly(methylstyrene-butadiene), poly(methyl methacrylate-butadiene), poly(ethyl methacrylate-butadiene), poly(propyl methacrylate-butadiene), poly (butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly (methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene), poly(styrene-propyl acrylate), poly (styrene-butyl acrylate), poly (styrene-butadiene-acrylic acid), poly(styrene-butadiene-methacrylic acid), poly (styrene-butadiene-acrylonitrile-acrylic acid), poly(styrene-butyl acrylate-acrylic acid), poly(styrene-butyl acrylate-methacrylic acid), poly(styrene-butyl acrylate-acrylononitrile), poly(styrene-butyl acrylate-acrylonitrile-acrylic acid), poly (styrene-butadiene), poly(styrene-isoprene), poly(styrene-butyl methacrylate), poly(styrene-butyl acrylate-acrylic acid), poly(styrene-butyl methacrylate-acrylic acid), poly (butyl methacrylate-butyl acrylate), poly(butyl methacrylate-acrylic acid), poly(acrylonitrile-butyl acrylate-acrylic acid), and combinations thereof. The polymers may be block, random, or alternating copolymers.

In embodiments, the resin is selected from the group consisting of styrenes, acrylates, methacrylates, butadienes, isoprenes, acrylic acids, methacrylic acids, acrylonitriles, and combinations thereof.

In certain embodiments, the resin is selected from the group consisting of poly(styrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly (ethyl acrylate-butadiene), poly(propyl acrylate-butadiene), poly(butyl acrylate-butadiene), poly(styrene-isoprene), poly (methylstyrene-isoprene), poly(methyl methacrylate-isoprene), poly(ethyl methacrylate-isoprene), poly(propyl methacrylate-isoprene), poly(butyl methacrylateisoprene), poly(methyl acrylate-isoprene), poly(ethyl acrylate-isoprene), poly(propyl acrylate-isoprene), poly(butyl acrylate-isoprene), poly(styrene-butylacrylate), poly(styrene-butadiene), poly(styrene-isoprene), poly(styrene-butyl methacrylate), poly(styrene-butyl acrylate-acrylic acid), poly(styrene-butadiene-acrylic acid), poly(styrene-isoprene-acrylic acid), poly(styrene-butyl methacrylate-acrylic acid), poly(butyl methacrylate-butyl acrylate), poly(butyl methacrylate-acrylic acid), poly(styrene-butyl acrylate-acrylonitrile-acrylic acid), poly(acrylonitrile-butyl acrylate-acrylic acid), and combinations thereof.

Surfactant.

In embodiments, the latex may be prepared in an aqueous phase containing a surfactant or co-surfactant. Surfactants which may be utilized with the polymer to form a latex dispersion can be ionic or nonionic surfactants, or combinations thereof, in an amount of from about 0.01 to about 15 weight percent of the solids, and in embodiments of from about 0.1 to about 10 weight percent of the solids.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Aldrich, NEOGEN R™, NEOGEN SC™ obtained from Daiichi Kogyo Seiyaku Co., Ltd., combinations thereof, and the like.

Examples of cationic surfactants include, but are not limited to, ammoniums, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, C12, C15, C17 trimethyl ammonium bromides, combinations thereof, and the like. Other cationic surfactants include cetyl pyridinium bromide, halide salts of quaternized polyoxyethylalkylamines, dodecylbenzyl triethyl ammonium chloride, MIRAPOL® and ALKAQUAT® available from Alkaril Chemical Company, SANISOL (benzalkonium chloride), available from Kao Chemicals, combinations thereof, and the like. In embodiments a suitable cationic surfactant includes SANISOL® B-50 available from Kao Corp., which is primarily a benzyl dimethyl alkonium chloride.

Examples of nonionic surfactants include, but are not limited to, alcohols, acids and ethers, for example, polyvinyl alcohol, polyacrylic acid, methalose, methyl cellulose, ethyl cellulose, propyl cellulose, hydroxyl ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, combinations thereof, and the like. In embodiments commercially available surfactants from Rhone-Poulenc such as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™ can be utilized.

The choice of particular surfactants or combinations thereof, as well as the amounts of each to be used, are within the purview of those skilled in the art.

In embodiments, the latex is prepared in a surfactant free process using the present amphiphilic block copolymer in place of traditional surfactants or dispersants.

Initiators.

In embodiments initiators may be added for formation of the latex polymer. Examples of suitable initiators include water soluble initiators, such as ammonium persulfate, sodium persulfate and potassium persulfate, and organic soluble initiators including organic peroxides and azo compounds including Vazo peroxides, such as VAZO64™, 2-methyl 2-2'-azobis propanenitrile, VAZO88™, 2-2'-azobis isobutyramide dehydrate, and combinations thereof. Other water-soluble initiators which may be utilized include azoamidine compounds, for example 2,2'-azobis(2-methyl-N-phenylpropionamidine) dihydrochloride, 2,2'-azobis[N-(4-chlorophenyl)-2-methylpropionamidine] di-hydrochloride, 2,2'-azobis[N-(4-hydroxyphenyl)-2-methyl-propionamidine]dihydrochloride, 2,2'-azobis[N-(4-amino-phenyl)-2-methylpropionamidine]tetrahydrochloride, 2,2'-azobis[N-methyl-N(phenylmethyl)propionamidine]dihydrochloride, 2,2'-azobis[N-methyl-N-2-propenylpropionamidine]dihydrochloride, 2,2'-azobis[N-(2-hydroxy-ethyl)2-methylpropionamidine]dihydrochloride, 2,2'-azobis[2-(5-methyl-2-imidazolin-2-yl)propane]dihydrochloride, 2,2'-azobis[N-(2-imidazolin-2-yl)propane]dihydrochloride, 2,2'-azobis[N-(4,5,6,7-tetrahydro-1H-1,3-diazepin-2-yl)propane] dihydrochloride, 2,2'-azobis[N-(3,4,5,6-tetrahydropyrimidin-2-yl)propane]dihydrochloride, 2,2'-azobis[N-(5-hydroxy-3,4,5,6-tetrahydropyrimidin-2-yl) propane]dihydrochloride, 2,2'-azobis {2-[1-(2-hydroxyethyl)-2-imidazolin-2-yl]propane}dihydrochloride, combinations thereof, and the like.

Initiators can be added in suitable amounts, such as from about 0.1 to about 8 weight percent of the monomers, and in embodiments of from about 0.2 to about 5 weight percent of the monomers.

Chain Transfer Agent.

In embodiments, chain transfer agents may also be utilized in forming the latex polymer. Suitable chain transfer agents include dodecane thiol, octane thiol, carbon tetrabromide, combinations thereof, and the like, in amounts from about 0.1 to about 10 percent and, in embodiments, from about 0.2 to about 5 percent by weight of monomers, to control the molecular weight properties of the latex polymer when emulsion polymerization is conducted in accordance with the present disclosure.

Additives.

In embodiments, the toner particles may further contain optional additives as desired or required. For example, the toner may include positive or negative charge control agents, such as in an amount of from about 0.1 to about 10%, or from about 1 to about 3% by weight of the toner. Examples of suitable charge control agents include quaternary ammonium compounds inclusive of alkyl pyridinium halides, bisulfates, alkyl pyridinium compounds, including those disclosed in U.S. Pat. No. 4,298,672, which is hereby incorporated by reference herein in its entirety, organic sulfate and sulfonate compositions, including those discloses in U.S. Pat. No. 4,338,390, which is hereby incorporated by reference herein in its entirety, cetyl pyridinium tetrafluoroborates, distearyl dimethyl ammonium methyl sulfate, aluminum salts such as CONTRON E84™ or E88™ (Orient Chemical Industries, Ltd.), and mixtures and combinations thereof.

There can also be blended with the toner particles external additive particles including flow aid additives, which additives may be present on the surface of the toner particles. Examples of these additives include metal oxides such as titanium oxide, silicon oxide, aluminum oxide, cerium oxide, tin oxide, mixtures thereof, and the like; colloidal and amorphous silicas, such as AEROSIL®, metal salts and metal salts of fatty acids inclusive of zinc stearate, calcium stearate, or long chain alcohols such as UNILIN® 700, and mixtures and combinations thereof.

Silica may be applied to the toner surface for toner flow, tribo enhancement, admix control, improved development and transfer stability, and higher toner blocking temperature. TiO2 may be applied for improved relative humidity (RH) stability, tribo control, and improved development and transfer stability. Zinc stearate, calcium stearate and/or magnesium stearate may optionally also be used as an external additive for providing lubricating properties, developer conductivity tribo enhancement, enabling higher toner charge and charge stability by increasing the number of contacts between toner an carrier particles. In embodiments, a commercially available zinc stearate known as Zinc Stearate L, available from Ferro Corporation, may be used. The external surface additives may be used with or without a coating.

Each of these external additives may be present in any suitable or desired amount, such as from about 0.1 percent by weight to about 5 percent by weight of the toner, or from about 0.2 percent by weight to about 3 percent by weight of the toner.

The latex emulsion containing the resin or resins may be utilized to form a toner by any method within the purview of those skilled in the art. In embodiments, the latex emulsion is dried and coated with a metal layer as described herein to form the hybrid metallic-latex particle which is then used as a raw toner component in an emulsion aggregation toner process.

The latex emulsion may be contacted with an optional colorant, optionally in the form of a colorant dispersion, and other additives to form a toner by a suitable process, in embodiments, an emulsion aggregation and coalescence process. In embodiments, the toner processes herein employ the latex emulsions herein to produce particle sizes that are suitable for emulsion aggregation ultra low melt processes.

In embodiments, a toner process herein comprises providing an aqueous emulsion comprising at least one amphiphilic block copolymer component as described herein, at least one of a resin; a latex particle, a wax, and a colorant, and aggregating toner particles from the aqueous emulsion.

Optionally, the toner process further comprises coalescing the aggregated toner particles.

In embodiments, the toner process further comprises wherein the aggregated toner particles form a core, and further comprise, during aggregation, adding additional emulsion to form a shell over the core. In certain embodiments, the additional emulsion forming the shell is the same material as the emulsion forming the core. In other embodiments, the additional emulsion forming the shell can be different from the material forming the toner core.

In embodiments, the process further comprises adding a second latex polymer to the aggregated toner particles to form a shell over the aggregated toner particles thereby forming a core-shell toner; adding the coalescing agent to the toner particles, and subsequently heating the core-shell toner with the coalescing agent at a temperature above the glass transition temperature of the second latex polymer.

In embodiments, the second latex polymer comprises a latex polymer; or a second hybrid metallic-latex particle comprising a resin latex particle having a surface and a metal layer disposed on the latex particle surface, wherein the second hybrid metallic-latex particle is the same or different from the first hybrid metallic-latex particle.

In other embodiments, the toner herein can be formed by a process comprising homogenizing the resin emulsion with a surfactant, in embodiments, wherein the surfactant is an amphiphilic block copolymer as described herein, an optional colorant, an optional wax, and an optional coagulant to form a homogenized toner slurry comprising pre-aggregated particles at room temperature; heating the slurry to form aggregated toner particles; optionally freezing the toner slurry once at the desired aggregated particle size; and further heating the aggregated particles in the slurry to coalesce the aggregated particles into toner particles.

Heating to form aggregated toner particles may be to any suitable or desired temperature for any suitable or desired time. In embodiments heating to form aggregated toner particles may be to a temperature below the Tg of the latex, in embodiments to from about 30° C. to about 70° C. or to about 40° C. to about 65° C., for a period of time of from about 0.2 hour to about 6 hours, from about 0.3 hour to about 5 hours, in embodiments, resulting in toner aggregates of from about 3 microns to about 15 microns in volume average diameter, in embodiments of from about 4 microns to about 8 microns in volume average diameter, although not limited.

Freezing the toner slurry to stop particle growth once the desired aggregated particle size is achieved can be by any suitable or desired method. In embodiments, the mixture is cooled in a cooling or freezing step. In embodiments, the mixture is pH adjusted, such as by freezing the aggregation of the particles with a buffer solution having a pH of about 7 to about 12, over a period of from about 1 minute to about 1 hour, or to about 8 hours or from about 2 minutes to about 30 minutes. In embodiments, cooling a coalesced toner slurry includes quenching by adding a cooling medium such as, for example, ice, dry ice and the like, to effect rapid cooling to a temperature of from about 20° C. to about 40° C. or from about 22° C. to about 30° C.

Coalescing the aggregated particles into toner particles can be by any suitable or desired method. In embodiments, coalescing comprises further heating the aggregated particles in the slurry to coalesce the aggregated particles into toner particles. In embodiments, the aggregate suspension may be heated to a temperature at or above the Tg of the latex. Where the particles have a core-shell configuration, heating may be above the Tg of the first latex used to form the core and the Tg of the second latex used to form the shell, to fuse the shell latex with the core latex. In embodiments, the aggregate suspension may be heated to a temperature of from about 80° C. to about 120° C. or from about 85° C. to about 98° C., for a period of time from about 1 hour to about 6 hours or from about 2 hours to about 4 hours.

The toner slurry may then be washed. In embodiments, washing may be carried out at a pH of from about 7 to about 12 or from about 9 to about 11 and the washing may be at a temperature of from about 30° C. to about 70° C. or from about 40° C. to about 67° C. The washing may include filtering and reslurrying a filter cake including toner particles in deionized water. The filter cake may be washed one or more times by deionized water, or washed by a single deionized water wash at a pH of about 4 wherein the pH of the slurry is adjusted with an acid, and followed optionally by one or more deionized water washes.

In embodiments, drying may be carried out at a temperature of from about 35° C. to about 85° C. or from about 45° C. to about 60° C. The drying may be continued until the moisture level of the particles is below a set target of about 1% by weight, in embodiments of less than about 0.7% by weight.

pH Adjustment Agent.

In some embodiments a pH adjustment agent may be added to control the rate of the emulsion aggregation process. The pH adjustment agent utilized in the processes of the present disclosure can be any acid or base that does not adversely affect the products being produced. Suitable bases can include metal hydroxides, such as sodium hydroxide, potassium hydroxide, ammonium hydroxide, and optionally combinations thereof. Suitable acids include nitric acid, sulfuric acid, hydrochloric acid, citric acid, acetic acid, and optionally combinations thereof.

Wax Dispersion.

In embodiments, the amphiphilic block copolymer is used in a wax dispersion. The wax dispersion may be used for any suitable or desired purpose, in embodiments, as a raw material in a toner emulsion aggregation process.

Wax particles can be formed by any suitable or desired process. The formed wax particles can be dried using any suitable or desired method including, but not limited to, spray drying or freeze drying. The wax particles can be dispersed in an electrolyte with surfactant using any suitable or desired process, such as sonication or shear, to break up aggregates in a similar manner as used when preparing a pigment dispersion. In embodiments, the wax particles are dispersed using the amphiphilic block copolymer described herein. The formed wax dispersion is then used as a raw material dispersion in a toner process, in embodiments, an emulation aggregation process. The wax particle can be formed from any suitable or desired wax.

Wax dispersions may also be added during formation of a latex polymer in an emulsion aggregation synthesis. Suitable waxes include, for example, submicron wax particles in the size range of from about 50 to about 1000 nanometers, in embodiments of from about 100 to about 500 nanometers in volume average diameter, suspended in an aqueous phase of water and an ionic surfactant, nonionic surfactant, or combinations thereof. Suitable surfactants include those described above. In embodiments, the wax dispersion is a surfactant free dispersion in that the present amphiphilic block copolymer is used in place of a traditional surfactant. The ionic surfactant or nonionic surfactant may be present in an amount of from about 0.1 to about 20 percent by weight, and in embodiments of from about 0.5 to about 15 percent by weight of the wax.

The wax dispersion according to embodiments of the present disclosure may include, for example, a natural vegetable wax, natural animal wax, mineral wax, and/or synthetic wax. Examples of natural vegetable waxes include, for example, carnauba wax, candelilla wax, Japan wax, and bayberry wax. Examples of natural animal waxes include, for example, beeswax, punic wax, lanolin, lac wax, shellac wax, and spermaceti wax. Mineral waxes include, for example, paraffin wax, microcrystalline wax, montan wax, ozokerite wax, ceresin wax, petrolatum wax, and petroleum wax. Synthetic waxes of the present disclosure include, for example, Fischer-Tropsch wax, acrylate wax, fatty acid amide wax, silicone wax, polytetrafluoroethylene wax, polyethylene wax, polypropylene wax, and combinations thereof.

In embodiments, the wax is selected from the group consisting of polyolefins, carnauba wax, rice wax, candelilla wax, sumacs wax, jojoba oil, beeswax, montan wax, ozokerite, ceresin, paraffin wax, microcrystalline wax, Fischer-Tropsch wax, stearyl stearate, behenyl behenate, butyl stearate, propyl oleate, glyceride monostearate, glyceride distearate, pentaerythritol tetra behenate, diethyleneglycol monostearate, dipropyleneglycol distearate, diglyceryl distearate, triglyceryl tetrastearate, sorbitan monostearate, and combinations thereof.

In embodiments, the wax is selected from the group consisting of polyethylene, polypropylene, and mixtures thereof.

Examples of polypropylene and polyethylene waxes include those commercially available from Allied Chemical and Baker Petrolite, wax emulsions available from Michelman Inc. and the Daniels Products Company, EPOLENE® N-15 commercially available from Eastman Chemical Products, Inc., VISCOL® 550-P, a low weight average molecular weight polypropylene available from Sanyo Kasel K.K., and similar materials. In embodiments, commercially available polyethylene waxes possess a molecular weight (Mw) of from about 100 to about 5000, and in embodiments of from about 250 to about 2500, while the commercially available polypropylene waxes have a molecular weight of from about 200 to about 10,000, and in embodiments of from about 400 to about 5000.

In embodiments, the waxes may be functionalized. Examples of groups added to functionalize waxes include amines, amides, imides, esters, quaternary amines, and/or carboxylic acids. In embodiments, the functionalized waxes may be acrylic polymer emulsions, for example, JONCRYL® 74, 89, 130, 537, and 538, all available from Johnson Diversey, Inc, or chlorinated polypropylenes and polyethylenes commercially available from Allied Chemical, Baker Petrolite Corporation and Johnson Diversey, Inc.

The wax may be present in any suitable or desired amount, such as an amount of from about 0.1 to about 30 percent by weight, and in embodiments from about 2 to about 20 percent by weight of the toner.

Colorants.

In embodiments, the present toners are prepared with a colorant dispersion prepared with the amphiphilic block copolymer described herein. The toner may optionally include a colorant selected from the group consisting of dyes, pigments, and combinations thereof.

The colorant particles can be dispersed in an electrolyte with surfactant using any suitable or desired process, such as sonication or shear, to break up aggregates in a similar manner as used when preparing a pigment dispersion.

In embodiments, the colorant is dispersed using the amphiphilic block copolymer described herein. The colorant dispersion is then used as a raw material dispersion in a toner process, in embodiments, an emulation aggregation process. The colorant particle can be formed from any suitable or desired colorant.

Any suitable or desired colorant can be selected in embodiments herein including various known suitable colorants, such as dyes, pigments, mixtures of dyes, mixtures of pigments, mixtures of dyes and pigments, and the like, which may be included in the toner or colorant dispersions herein. These colorants can be used as the core for the present hybrid metallic-colorant particle or alone as the toner colorant.

In embodiments, the colorant can be, for example, carbon black, cyan, yellow, magenta, red, orange, brown, green, blue, violet, or mixtures thereof.

In certain embodiments, the colorant is selected from the group consisting of dyes, pigments, and combinations of dyes and pigments. As examples of suitable colorants, mention may be made of carbon black such as REGAL 330® (Cabot), Carbon Black 5250 and 5750 (Columbian Chemicals), Sunsperse® Carbon Black LHD 9303 (Sun Chemicals); magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™;

Bayer magnetites, BAYFERROX 8600™, 8610™; Northern Pigments magnetites, NP604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE® 6000, FLEXIVERSE® and AQUATONE® water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED48™, LEMON CHROME YELLOW DCC1026™, E.D. TOLUIDINE RED™ and BON RED C™ available from Dominion Color Corporation, Ltd., Toronto, Ontario, NOVAPERM® YELLOW FGL™, HOSTAPERM® PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, Yellow 180, and Permanent Yellow FGL. Colored magnetites, such as mixtures of MAPICO BLACK™, and cyan components may also be selected as colorants. Other known colorants can be selected, such as Levanyl® Black A-SF (Miles, Bayer) and Sunsperse® Carbon Black LHD 9303 (Sun Chemicals), and colored dyes such as Neopen® Blue (BASF), Sudan Blue OS (BASF), PV Fast Blue B2G01 (American Hoechst), Sunsperse® Blue BHD 6000 (Sun Chemicals), Irgalite® Blue BCA (Ciba-Geigy), Paliogen® Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen® Orange 3040 (BASF), Ortho® Orange OR 2673 (Paul Uhlich), Paliogen® Yellow 152, 1560 (BASF), Lithol® Fast Yellow 0991K (BASF), Paliotol® Yellow 1840 (BASF), Neopen® Yellow (BASF), Novoperm® Yellow FG 1 (Hoechst), Permanent Yellow YE 0305 (Paul Uhlich), Lumogen® Yellow D0790 (BASF), Sunsperse® Yellow YHD 6001 (Sun Chemicals), Suco-Gelb® L1250 (BASF), Suco-Yellow® D1355 (BASF), Hostaperm® Pink E (American Hoechst), Fanal® Pink D4830 (BASF), Cinquasia® Magenta (DuPont), Lithol® Scarlet D3700 (BASF), Toluidine Red (Aldrich), Scarlet for Thermoplast NSD PS PA (Ugine Kuhlmann of Canada), E.D. Toluidine Red (Aldrich), Lithol® Rubine Toner (Paul Uhlich), Lithol® Scarlet 4440 (BASF), Bon Red C (Dominion Color Company), Royal® Brilliant Red RD-8192 (Paul Uhlich), Oracet® Pink RF (Ciba-Geigy), Paliogen® Red 3871K (BASF), Paliogen® Red 3340 (BASF), Lithol® Fast Scarlet L4300 (BASF), combinations of the foregoing, and the like.

In embodiments, organic soluble dyes having a high purity for the purpose of color gamut which may be utilized include Neopen Yellow 075, Neopen Yellow 159, Neopen Orange 252, Neopen Red 336, Neopen Red 335, Neopen Red 366, Neopen Blue 808, Neopen Black X53, and Neopen Black X55.

The dyes can be present in any suitable or desired amount, in embodiments, in an amount of from about 0.5 to about 20, or from about 5 to about 20 percent, by weight percent of the toner.

In certain embodiments wherein the colorant is a pigment, the pigment may be, for example, carbon black, phthalocyanines, quinacridones or RHODAMINE B™ type, red, green, orange, brown, violet, yellow, fluorescent colorants, and the like.

In embodiments, colorant examples include Pigment Blue 15:3 having a Color Index Constitution Number of 74160, Magenta Pigment Red 81:3 having a Color Index Constitution Number of 45160:3, Yellow 17 having a Color Index Constitution Number of 21105, and known dyes such as food dyes, yellow, blue, green, red, magenta dyes, and the like.

In other embodiments, a magenta pigment, Pigment Red 122 (2,9-dimethylquinacridone), Pigment Red 185, Pigment Red 192, Pigment Red 202, Pigment Red 206, Pigment Red 235, Pigment Red 269, and the like, and combinations thereof, may be utilized as the colorant.

When used in a toner, the colorant may be included in the toner any suitable or desired amount, in embodiments, the colorant may be included in the toner in an amount of from about 0.1 to about 35 percent by weight of the toner, or from about 1 to about 25 weight percent of the toner, or from about 2 to about 15 percent by weight of the toner.

Developer compositions can be prepared by mixing the toners obtained with the processes disclosed herein with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The carriers may be present from about 2 percent by weight of the toner to about 8 percent by weight of the toner, in embodiments from about 4 percent by weight to about 6 percent by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidene fluoride, mixtures of resins not in close proximity in the tribo electric series such as polyvinylidene fluoride and acrylics, thermosetting resins such as acrylics, combinations thereof and other known components.

The amphiphilic block copolymers herein can be using as dispersing agents for any suitable or desired compound. In embodiments, the amphiphilic block copolymers herein can be used as dispersing agents to disperse and/or stabilize colorant, in embodiments, pigment, wax, inorganic particles, polymer particles, inorganic nanoparticles, polymer nanoparticles, among others, and combinations thereof.

In embodiments, a dispersing agent herein comprises an amphiphilic block copolymer as described herein; wherein the amphiphilic block copolymer is prepared by a process comprising: dissolving at least one hydrophilic monomer in water; adding at least one hydrophobic monomer; optionally, adding a feed initiator; optionally, heating; to produce a colloidal dispersion of amphiphilic block copolymer; optionally, cooling; and optionally, discharging the produced amphiphilic block copolymer dispersing agent from the colloidal dispersion of amphiphilic block copolymer.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

The preparation method herein comprises the following steps: dissolving 0.5-15 parts hydrophilic monomers (Table 1) in water under agitation, adding 1-30 parts hydrophobic monomers (Table 1), heating to 45-95° C., adding feed initiator solutions (Table 1) continuously at a very low rate, polymerizing for 1-20 hours, cooling and discharging. A Stable colloidal dispersion comprising of amphiphilic block copolymers can be obtained. The resulting copolymers will have distinctly different solubility characteristics than random copolymers and two glass transition temperatures (Tgs) corresponding to the Tg of each homopolymer, indicating the formation of polymer blocks.

TABLE 1

| | Components |
|---|---|
| Hydrophilic monomers | β-Carboxyethyl Acrylate, (meth)acrylic acid, Sodium 4-vinylbenzenesulfonate, 2-Sulfoethyl methacrylate, 4-Vinylbenzoic acid, sodium acrylate, 3-Sulfopropyl (meth)acrylate (sodium or potassium salt), N,N-diethylacrylamide, N,N-dimethylacrylamide, 2-(N,N-diethylamino)ethyl methacrylate, 2-(N,N-dimethylamino)ethyl acrylate, N-(2-aminoethyl) methacrylamide hydrochloride, 2-acryloxyethyltrimethylammonium chloride, N-(2-aminoethyl) methacrylamide hydrochloride, methacryloyl-L-Lysine, etc. |
| Hydrophobic monomers | Styrene, alkyl acrylates, alkyl methacrylates, benzyl (meth)acrylates, 2-Phenoxyethyl methacrylate, etc. |
| Initiators | Ammonium persulfate, potassium persulfate, azobisisobutyronitrile, water soluble Azo initiators (such as VA-044, V-50, VA-057, VA-061, VA-086, V-501), etc. |

For further detail, see, Lu, Chunliang, and Marek W. Urban. "One-Step Synthesis of Amphiphilic Ultrahigh Molecular Weight Block Copolymers by Surfactant-Free Heterogeneous Radical Polymerization." ACS Macro Letters 4.12 (2015): 1317-1320, which is hereby incorporated by reference herein in its entirety.

Thus, a preparation method for preparing amphiphilic block copolymers using surfactant free emulsion polymerization is provided. Amphiphilic block copolymers are synthesized by conventional free radical polymerization in water. In the surfactant-free emulsion polymerization, hydrophilic and hydrophobic monomers are initiated by water-soluble initiators and polymerized sequentially to form block copolymers. No controlled radical polymerization chemical reagents are required. The resulting amphiphilic block copolymers can be potentially used as surfactants or stabilizers for colloidal dispersions, latexes and EA processes.

In embodiments, the method comprises the following steps: dissolving hydrophilic monomers (such as acrylic acids, 2-carboxyethyl acrylate, dimethylaminoethyl methacrylate, etc.) in water under agitation, adding hydrophobic monomers (such as butyl acrylate, styrene, etc.), feed initiator (such as ammonium/potassium persulfate, etc.) solutions continuously at a very low rate to initiate polymerization. Stable colloidal dispersion comprising of amphiphilic block copolymers are obtained. The process avoids the time-consuming and expensive synthetic procedure by controlled radical polymerizations (such as ATRP, RAFT, NMP, etc.). The block copolymers obtained consist of both hydrophobic and hydrophilic chain segments in different chain blocks, resulting in unique properties, such as compatibilizing effects, emulsification of oil, reduced surface tension of water, stabilization of colloidal particles, etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:
1. A toner process comprising:
(a) providing at least one amphiphilic block copolymer, wherein the amphiphilic block copolymer is prepared by surfactant-free emulsion polymerization comprising:
dissolving at least one hydrophilic monomer in water;
adding at least one hydrophobic monomer;
optionally, adding a feed initiator;
optionally, heating;
to produce a colloidal dispersion of amphiphilic block copolymer;
optionally, cooling; and
optionally, discharging the produced colloidal dispersion of amphiphilic block copolymer;
(b) contacting one or more components selected from the group consisting of a latex polymer, a wax; and a colorant with the colloidal dispersion of amphiphilic block copolymer to form a blend; or
contacting the discharged amphiphilic block copolymer with one or more latexes or dispersions selected from the group consisting of a latex polymer, a polymer dispersion, a wax dispersion, and a colorant dispersion, and forming a dispersion;
(c) heating the blend or dispersion at a temperature below the glass transition temperature of the latex polymer to form aggregated toner particles;
(d) adding a coalescing agent to the toner particles thereby coalescing the toner particles; and
(e) optionally, recovering the toner particles.
2. The toner process of claim 1, wherein dissolving at least one hydrophilic monomer in water comprises dissolving the at least one hydrophilic monomer in water under agitation.
3. The toner process of claim 1, wherein the feed initiator is added continuously at a rate of from about $10^{-4}$ mM/minute to about 1 M/minute.
4. The toner process of claim 1, wherein the amphiphilic block copolymer produced in step (a) comprises homopolymer blocks and wherein the amphiphilic block copolymer has at least two distinct glass transition temperatures corresponding to the glass transition temperature of each homopolymer.

5. The toner process of claim 1, wherein the amphiphilic block copolymer produced in step (a) comprises hydrophobic chain segments and hydrophilic chain segments in different chain blocks.

6. The toner process of claim 1, wherein the amphiphilic block copolymer produced in step (a) comprises a molecular weight of from about 5,000 g/mol to about $5 \times 10^6$ g/mol.

7. The toner process of claim 1, wherein the at least one hydrophilic monomer is selected from the group consisting of β-carboxyethyl acrylate, methacrylic acid, sodium 4-vinylbenzenesulfonate, 2-sulfoethyl methacrylate, 4-vinylbenzoic acid, sodium acrylate, 3-sulfopropyl methacrylate sodium salt, 3-sulfopropyl methacrylate potassium salt, N,N-diethylacrylamide, N,N-dimethylacrylamide, 2-(N,N-diethylamino)ethyl methacrylate, 2-(N,N-dimethylamino) ethyl acrylate, N-(2-aminoethyl) methacrylamide hydrochloride, 2-acryloxyethyltrimethylammonium chloride, N-(2-aminoethyl) methacrylamide hydrochloride, methacryloyl-L-Lysine, and combinations thereof.

8. The toner process of claim 1, wherein the at least one hydrophobic monomer is selected from the group consisting of styrene, alkyl acrylates, alkyl methacrylates, benzyl methacrylates, 2-phenoxyethyl methacrylate, and combinations thereof.

9. The toner process of claim 1, wherein the feed initiator is selected from the group consisting of ammonium persulfate, potassium persulfate, azobisisobutyronitrile, water soluble azo initiators, and combinations thereof.

10. The toner process of claim 1, further comprising:
adding a second latex polymer to the aggregated toner particles to form a shell over the aggregated toner particles thereby forming a core-shell toner;
adding the coalescing agent to the toner particles, and subsequently heating the core-shell toner with the coalescing agent at a temperature above the glass transition temperature of the second latex polymer.

11. A toner produced by the process of claim 1.

12. The toner process of claim 1, wherein the latex polymer is a polyester.

13. The toner process of claim 1, wherein the feed initiator is added continuously at a rate of from about $10^{-6}$ mM/minute to about 100 mM/minute.

14. The toner process of claim 1, wherein the latex polymer is an amorphous polyester, a crystalline polyester, or a mixture thereof.

15. The toner process of claim 1, wherein the latex polymer is a polymer formed from a monomer selected from the group consisting of styrenes, acrylates, methacrylates, butadienes, isoprenes, acrylic acids, methacrylic acids, acrylonitriles, and combinations thereof.

* * * * *